(12) United States Patent
Smart et al.

(10) Patent No.: US 8,699,356 B2
(45) Date of Patent: Apr. 15, 2014

(54) METHOD AND SYSTEM FOR DIAGNOSING A FAULT OR OPEN CIRCUIT IN A NETWORK

(75) Inventors: David C. Smart, Waterloo, IA (US); Michael R. Schlichtmann, Fargo, ND (US); Ronald G. Landman, Fargo, ND (US)

(73) Assignee: Deere & Company, Moline, IL (US)

( * ) Notice: Subject to any disclaimer, the term of this patent is extended or adjusted under 35 U.S.C. 154(b) by 336 days.

(21) Appl. No.: 13/099,455

(22) Filed: May 3, 2011

(65) Prior Publication Data

US 2012/0155285 A1 Jun. 21, 2012

Related U.S. Application Data

(60) Provisional application No. 61/424,926, filed on Dec. 20, 2010.

(51) Int. Cl.
G06F 11/00 (2006.01)

(52) U.S. Cl.
USPC .......................................... 370/242; 370/251

(58) Field of Classification Search
USPC ................. 370/242–245, 246–248, 250–252; 714/25, 30–31, 37, 42–44, 47.1–47.2, 714/48–49
See application file for complete search history.

(56) References Cited

U.S. PATENT DOCUMENTS

| | | | |
|---|---|---|---|
| 4,266,292 A * | 5/1981 | Regan et al. ................ | 370/242 |
| 4,376,999 A * | 3/1983 | Abbott et al. ................ | 370/217 |
| 4,395,767 A | 7/1983 | Van Brunt et al. | |
| 4,521,848 A * | 6/1985 | Bruce et al. .................... | 714/43 |
| 4,825,438 A * | 4/1989 | Bennett et al. .................. | 714/56 |
| 4,841,232 A | 6/1989 | Graham et al. | |
| 4,951,283 A * | 8/1990 | Mastrocola et al. ........... | 714/43 |
| 5,066,919 A | 11/1991 | Klassen et al. | |
| 5,373,514 A * | 12/1994 | Ma .............................. | 714/811 |
| 5,390,326 A | 2/1995 | Shah | |
| 5,452,308 A * | 9/1995 | Kaminski et al. ............ | 714/712 |
| 5,477,529 A | 12/1995 | Gingell | |
| 5,815,511 A * | 9/1998 | Yamamoto .................... | 714/733 |
| 5,956,324 A * | 9/1999 | Engdahl et al. ............... | 370/242 |
| 6,324,658 B1 | 11/2001 | Jasperneite et al. | |

(Continued)

FOREIGN PATENT DOCUMENTS

| | | |
|---|---|---|
| CN | 2859555 | 1/2007 |
| EP | 0716311 | 3/2003 |

OTHER PUBLICATIONS

International Search Report and the Written Opinion of the International Searching Authority Mar. 7, 2012, 10 pages.

Primary Examiner — Kevin Mew

(57) ABSTRACT

A fault injection circuit injects a test signal into a data bus with a normal high logic level and a normal low logic level. The test signal has a greater logic level greater than the normal high logic level of the data bus or a lower logic level lower than the normal low logic level of the data bus. An analog-to-digital converter is coupled to a voltage level detector for sensing an aggregate level of an aggregate signal on the data bus. The aggregate signal is composed of the termination circuit signal and the test signal. A diagnostic tool determines whether a faulty connection between the data bus and a network device exists, where the sensed aggregate level exceeds at least one of the normal high logic level and the normal low logic level.

17 Claims, 5 Drawing Sheets

(56) References Cited

U.S. PATENT DOCUMENTS

| | | |
|---|---|---|
| 7,337,086 B2 | 2/2008 | Guralnik et al. |
| 7,514,937 B2 | 4/2009 | Mirov et al. |
| 7,577,212 B2 * | 8/2009 | Keeth et al. .................. 375/316 |
| 2004/0153860 A1 * | 8/2004 | Whetsel ........................ 714/43 |
| 2005/0262492 A1 * | 11/2005 | Goetting et al. .............. 717/151 |
| 2009/0240604 A1 | 9/2009 | Thurston et al. |
| 2010/0171630 A1 | 7/2010 | Carralero et al. |
| 2010/0253364 A1 | 10/2010 | Ganesh |

\* cited by examiner

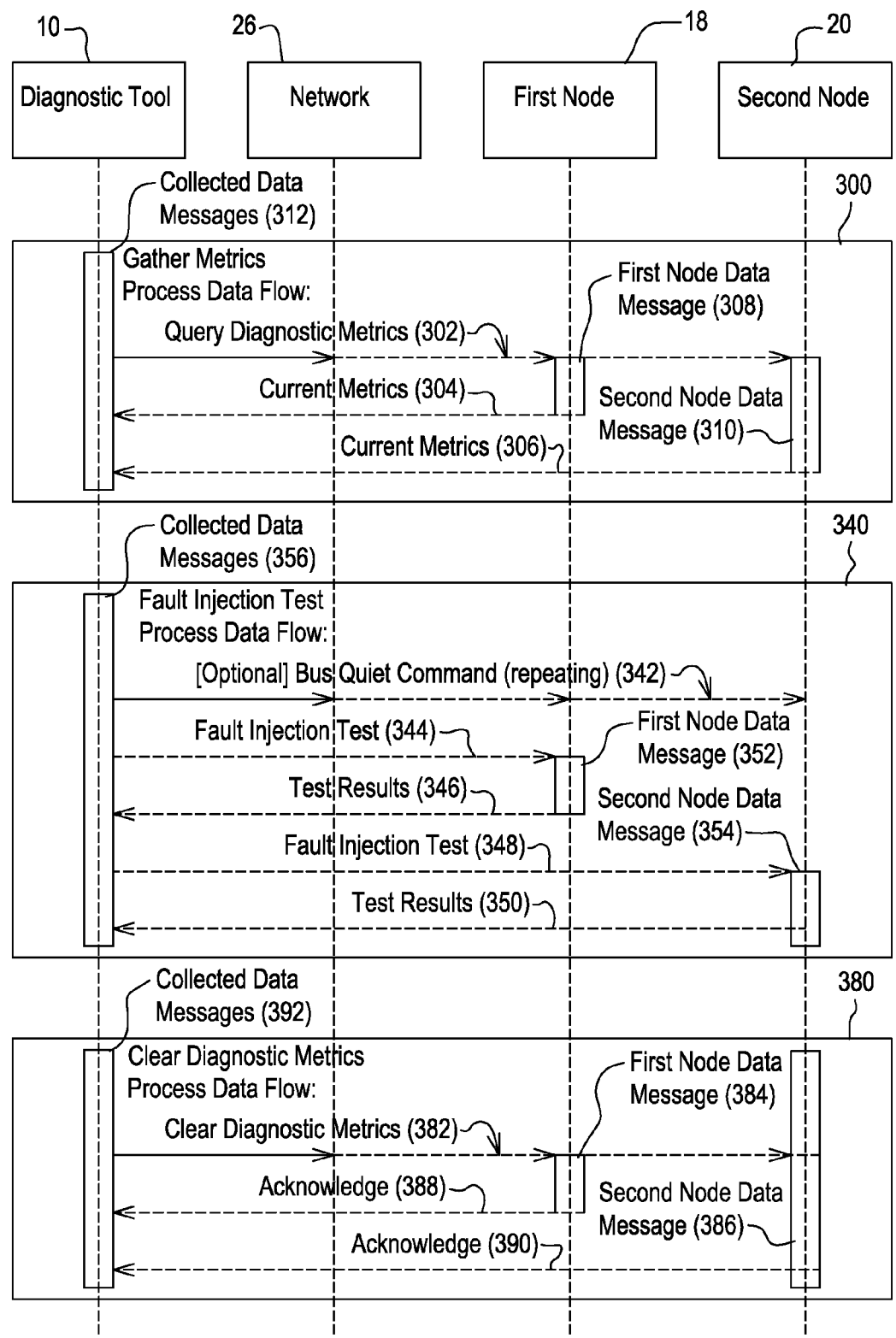

METHOD AND SYSTEM FOR DIAGNOSING A FAULT OR OPEN CIRCUIT IN A NETWORK

This document claims priority based on U.S. provisional application Ser. No. 61/424,926, filed on Dec. 20, 2010 and entitled METHOD AND SYSTEM FOR DIAGNOSING A FAULT OR OPEN CIRCUIT IN A NETWORK, under 35 U.S.C. 119(e).

FIELD OF THE INVENTION

This invention relates to a method and system for diagnosing a fault or open circuit in a network.

BACKGROUND

In the prior art, a vehicle or equipment may be configured with a controller area network (CAN) data bus or another network data bus that supports communication between controllers and other network elements. The vehicle data bus communicates signals over a transmission line, such as one or more twisted pairs of wire or a coaxial cable, for example. If the transmission line is cut or damaged, communications over the network data bus can be impaired, intermittent or absent. Physical visual inspection of the transmission line may not be practical or possible where the cable is routed through conduit, sheathing, frame members, unibody vehicle structures, body panels, or other equipment structures. Thus, there is a need for an alternative method and system for diagnosing a fault or open circuit in a network.

SUMMARY OF THE INVENTION

In accordance with one embodiment, a method and system is capable of diagnosing a fault or open circuit in a network (e.g., vehicle network). The network comprises a network data bus and one or more network elements. The network data bus has a normal high logic level and a normal low logic level consistent with a termination circuit signal applied by said one or more network elements. A fault injection circuit is adapted to inject a test signal into the network data bus during a test time period. The test signal has at least one of a greater logic level greater than the normal high logic level of the data bus or a lower logic level lower than the normal low logic level of the data bus. An analog-to-digital converter is coupled to a detector (e.g., voltage level detector) for sensing an aggregate level of an aggregate signal on the network data bus. The aggregate signal is composed of the termination circuit signal and the test signal. A diagnostic tool indicates whether a faulty connection between the data bus and a network device exists, where a faulty connection results in the sensed aggregate level of the detector exceeding at least one of the normal high logic level and the normal low logic level.

BRIEF DESCRIPTION OF THE DRAWINGS

FIG. 3 is a diagram that illustrates communication of data messages between a diagnostic tool and network elements in a network to facilitate one or more diagnostic tests.

DESCRIPTION OF THE PREFERRED EMBODIMENT

Figure 1:
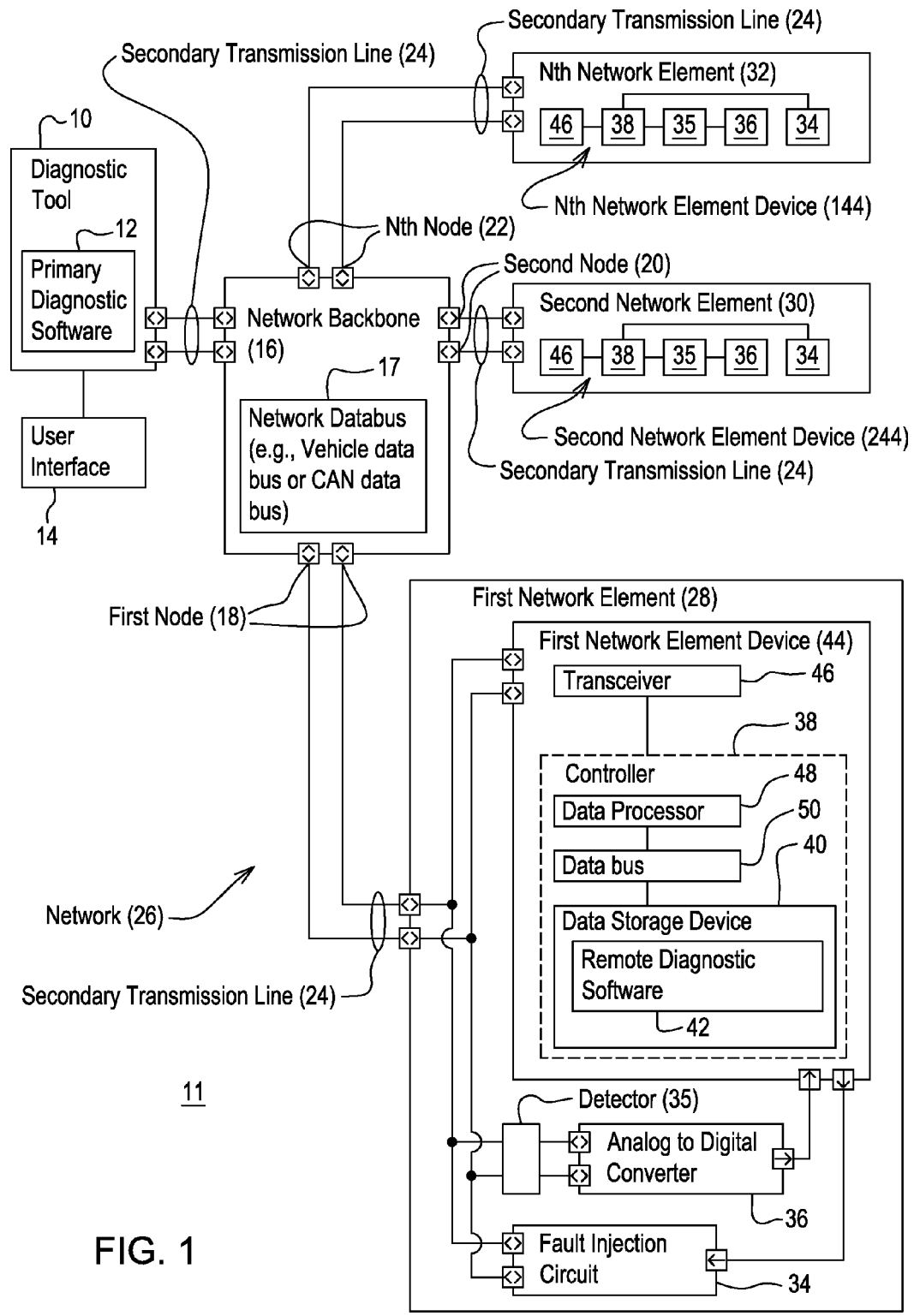
FIG. 1 is a block diagram of one embodiment of a system for diagnosing a fault or open circuit in a network.

In FIG. 1, in accordance with one embodiment, a system 11 is configured for diagnosing a fault or open circuit in a network 26. The network 26 may refer to a vehicle network, an implement network, a subnet, a subnet of vehicle network, a subnet of an implement network, or any other network. The system 11 comprises a network 26, a network backbone 16 (e.g., network data bus 17), one or more network elements (28, 30, 32), a fault injection circuit 34, a detector 35, and analog-to-digital converter 36, and a diagnostic tool 10. At least one network element (28, 30, 32) comprises a fault injection circuit 34, a detector 35 and an analog-to-digital converter 36. The diagnostic tool 10 is coupled to the data network 26. The diagnostic tool 10 and the network elements (28, 30, 32) are capable of communicating over the network data bus 17, network backbone 16, or an auxiliary data bus of the network 26.

In one embodiment, the network 26 comprises a network backbone 16 and one or more network elements (28, 30, 32). For example, the network backbone 16 may comprise one or more of the following: a network data bus 17, a vehicle data bus, a data bus, or a Controller Area Network (CAN) data bus. The network data bus 17 comprises a physical data path, a logical data path (e.g., virtual data path), or both. The network data bus 17 provides one or more data paths that support the communications of data between a source and a destination, for example.

The network 26 has a network architecture that refers to the underlying physical structure and data structure of the network 26. The physical structure of the network 26 may be referred to as the network backbone 16. The network backbone 16 of the network 26 may comprise transmission line for the network data bus 17, connectors, impedance matching interfaces, amplifiers, repeaters, filters, splitters, combiners, terminations, stubs, interfaces and hardware, for example. The data structure of the network 26 may comprise functional layers, interfaces and protocols to support data communications (e.g., without unresolved conflict) between network elements (28, 30, 32) over the network data bus 16.

The transmission line of the network 26 may comprise one or more twisted pairs, ribbon cable, multi-conductor cable, shielded multi-conductor cable, a coaxial cable, optical cable, a wiring harness, or another transmission line. In one configuration of the network 26, the network data bus 17 or network backbone 16 is associated with one or more digital logic levels. For example, the network data bus 17 or network backbone 16 has a normal high logic level and a normal low logic level consistent with a termination circuit signal applied by said one or more network elements (28, 30, 32) of the network 26.

Each network element (28, 30, 32) is associated with a node (18, 20, 22) or node identifier, where the network element is coupled or connected to the network data bus 17. Each network element (28, 30, 32) may comprise a controller 38, an actuator, a sensor, a communications device, or another electronic device. For example, an engine controller, a transmission controller, or a combination controller (e.g., combined engine controller and transmission controller) may be connected to the network 26 for communication to other network elements (28, 30, 32) via the network 26.

In one embodiment, the first network element 28 comprises a first network element device 44, an analog-to-digital converter 36, a detector 35, and a fault injection circuit 34. The first network element device 44 comprises a transceiver 46 (e.g., CAN transceiver) coupled to controller 38. The transceiver 46 is coupled to the network backbone 16 (e.g., network data bus 17) and network 26 to provide a communications interface between the first network element device 44 and the network 26 or network backbone 16.

The controller 38 comprises a data processor 48 and a data storage device 40 coupled to a data bus 50. The data processor 48 may comprise a microprocessor, a microcontroller, a programmable logic array, an application specific integrated circuit, or another electronic device for processing or manipulating data. The data storage device 40 stores or contains remote diagnostic software 42. The data storage device 40 comprises electronic memory (e.g., non-volatile random access memory), an optical storage device, a magnetic storage device, a magnetic disk drive, or another device for storing, retrieving and managing electronic data.

The remote diagnostic software 42 may reside in the data storage device 40 (e.g., electronic memory) of the network element device or in the transceiver 46. For example, the remote diagnostic software 42 may be stored in the data storage device 40 for non-transitory data storage or in technologically similar data storage device in the transceiver 46. A data processor 48 of the network element device or a technically similar data processor in the transceiver 46 may execute the remote diagnostic software 42. In one embodiment, the analog-to-digital converter 36 provides an interface between the network backbone 16 and remote diagnostic software 42. Conversely, the fault injection circuit 34 provides an interface between the remote diagnostic software 42 and the network backbone 16. The remote diagnostic software 42 and its interface may use or control hardware that is associated with the transceiver 46, the first network element device 44, or both.

The fault injection circuit 34 is capable of communicating with the remote diagnostic software 42. The fault injection circuit 34 may comprise fault injection logic and an isolated voltage supply (or current source) for providing a test signal during a test interval, where the test signal may comprise a voltage pulse, a generally rectangular wave, a substantially square wave, a pulse train, or another suitable test signal. The fault injection circuit 34 is configured or adapted for injecting a test signal into the network data bus 17, the network backbone 16, or secondary transmission lines 24 of the network 26 during a test time period.

In a first example, the fault injection circuit 34 may inject a test signal into the network data bus 17 of the network 26 via an impedance bridge or a resistive interface (e.g., pull-up resistor) with a high impedance with respect to the network data bus 17. In a second example, the fault injection circuit 34 may inject a test signal into the network data bus 17 of the network 26 via the transceiver 46. In one configuration, the test signal has at least one of a greater logic level greater than the normal high logic level of the network data bus 17 or a lower logic level lower than the normal low logic level of the network data bus 17. The fault injection circuit 34 represents a diagnostic enhancement that is not found in many commercially available network elements that are suitable for interfacing with network data bus 17, for instance.

In one configuration, if the network data bus 17 comprises a CAN data bus, a normal high logic level is approximately 3.5 volts direct current (DC) and the normal logic level is approximately 1.5 volts direct current (DC). Further, if the network data bus 17 comprises a CAN data bus, in certain configurations, the test signal has greater logic level equal to approximately 5 volts direct current (DC) and a lesser logic level equal to approximately 0 volts direct current (DC).

In one embodiment, the detector 35 (e.g., voltage level detector) is coupled as an intermediary circuit between the network data bus 17 and analog-to-digital converter 36. The detector 35 may comprise a comparator (e.g., operational amplifier) with a reference voltage applied to one input and the aggregate voltage of the network data bus 17 applied to the other input, via an input resistor or otherwise. The output of the detector 35 (e.g., comparator) may be coupled to an input of the analog-to-digital converter 36, or scaled with a voltage divider or voltage scaling circuit prior to application to an input of the analog-to-digital converter 36.

An input of the analog-to-digital converter 36 is coupled to the detector 35 (e.g., voltage level detector) for sensing an aggregate level of an aggregate signal on the network data bus 17. An output of the analog-to-digital converter 36 is coupled to the controller 38, or the network element device (44, 144, or 244). The aggregate signal is composed of the termination circuit signal and the test signal. For example, one or more network elements (28, 30, 32) provide or apply the termination circuit signal to the network data bus 17 during normal operation, where the termination circuit signal may comprise one or more of the following a data packet (e.g., Controller Area Network (CAN) data packet), a data message, an idle signal, an idle data message, a low logic level signal, a high logic level signal, a bias signal (e.g., a voltage level between a normal high logic level signal and a normal low logic level signal). The test signal is greater than a high logic level signal, lesser than the low logic level signal, or otherwise distinguishable from the termination circuit signal in frequency, time amplitude, pulse duration, pulse shape, waveform magnitude versus time response, or otherwise. The fault injection circuit 34 provides the test signal.

The remote diagnostic software 42 has software instructions that are adapted to (1) determine whether or not a fault or open circuit exists based on the output of the analog-to-digital converter 36 and the associated detector 35, and (2) report the fault or the open circuit and an associated respective node identifier to the diagnostic tool 10 via the network backbone 16 (to the extent the network backbone is functional), via an auxiliary data bus (e.g., redundant CAN data bus) or via an alternate wireline communications system or a wireless communication system.

The diagnostic tool 10 may comprise an electronic data processing system (e.g., computer) with a user interface 14 that is coupled to the communications network 26 via the network backbone 16 for identification of the location of faults or open circuits. The diagnostic tool 10 may comprise primary diagnostic software 12 that can communicate with the remote diagnostic software 42 in one or more network elements (28, 30, 32) coupled to the communications network 26 via a network data bus 16, an auxiliary data bus, or via a back-up wire line connection (e.g., Ethernet, Universal Serial Bus (USB), parallel or serial ports of the diagnostic tool 10 and the controller 38 connected with null-modem cables, or otherwise) between data ports of the diagnostic tool 10 and the corresponding network elements. The user interface 14 comprises one or more of the following: a display, a keyboard, a keypad, a switch, and a pointing device (e.g., an electronic mouse or trackball).

A diagnostic tool 10 determines whether a faulty connection between the network data bus 16 and a network 26 device exists for reporting (e.g., displaying an audible or visual alert) to a user via the user interface 14. A faulty connection results in the sensed aggregate level exceeding at least one of the normal high logic level and the normal low logic level.

In one illustrative example, shown in FIG. 1, the network elements may comprise a first network element 28, a second network element 30, up to an Nth network element 32, where N is any positive integer number greater than 2. The first network element 28 is coupled to the network data bus 17 (e.g., CAN data bus) or network backbone 16 at the first node 18. The fault injection circuit 34 of the first network element 28 facilitates injection of the test signal at a first node 18. A detector 35 (e.g., voltage level detector), of the first network element 28 or the first network element device 44, is capable of sensing a signal level (e.g., voltage level) on the secondary transmission line 24 at the first node 18. A data processor 48 is adapted for determining that a faulty connection or open circuit exists between the first network element 28 and the network data bus 17 at the first node 18 if the sensed aggregate level violates a benchmark or exceeds at least one of the normal high logic level and the normal low logic level.

The second network element 30 is coupled to the network data bus 17 (e.g., CAN data bus) or the network backbone 16 at a second node 20. The second network element 30 is equipped with a transceiver 46, a controller 38, a detector 35, an analog-to-digital converter 36, and a fault injection circuit 34. The second network element 30 comprises a second network element device 244 that comprises the transceiver 46 coupled to the controller 38.

The fault injection circuit 34 of the second network element 30 facilitates injection of the test signal at a second node 20. The detector 35 (e.g., voltage level detector) of the second network element 30 or second network element device 244, is capable of sensing a signal level (e.g., voltage level) on the secondary transmission line 24 at the second node 20. The data processor 48 in the second network element device 244 is arranged for determining that a faulty connection or open circuit exists between the second network element 30 and the network data bus 17 or the network backbone 16 at the second node 20 if the sensed aggregate level violates a benchmark, or exceeds at least one of the normal high logic level or and the normal low logic level.

The Nth network element 32 is coupled to the network data bus 17 or the network backbone 16 at an Nth node 22. The Nth network element 32 is equipped with a transceiver 46, a controller 38, a detector 35, an analog-to-digital converter 36, and a fault injection circuit 34. The Nth network element 32 comprises an Nth network element device 144 that comprises the transceiver 46 coupled to the controller 38.

The fault injection circuit 34 of the Nth network element 32 facilitates injection of the test signal at a Nth node 22. The detector 35 (e.g., voltage level detector) of the Nth network element 32 or Nth network element device 144, is capable of sensing a signal level (e.g., voltage level) on the secondary transmission line 24 at the Nth node 22. The data processor 48 in the Nth network element device 144 is arranged for determining that a faulty connection or open circuit exists between the Nth network element 32 and the network data bus 17 or the network backbone 16 at the Nth node 22 if the sensed aggregate level violates a benchmark, or exceeds at least one of the normal high logic level and the normal low logic level.

Each one of said one or more network elements (28, 30, 32) comprises a corresponding fault injection circuit (e.g., 34) and a corresponding voltage level detector 35 (e.g., voltage level detector). The corresponding fault injection circuit 34 is configured or adapted to inject the test signal on a node-by-node basis at each node of the network data bus 17 or network backbone 16 in the network 26.

The corresponding detector 35 (e.g., voltage level detector) senses the detected voltage level on a node-by-node basis (18, 20, 22) at each node of the network data bus 17 in the network 26, where each node is formed at the connection or attempted connection of a network element or network element device to the network data bus 17. A transceiver 46 in each network element is arranged or adapted for reporting the sensed aggregate level by each node to the diagnostic tool 10 coupled to the data bus 17, or via an auxiliary data bus.

In one configuration, each node (e.g., 18, 20, 22) is assigned a different test time period by the diagnostic tool 10 or a controller 38 (e.g., master controller at one node that communicates with slave controllers at other nodes, where master-slave settings are programmable or user-selectable) on the network 26. For example, each node is assigned a different test time period within a periodic interval or regular interval. Each fault injection circuit 34 at each node has instructions or receives a triggering signal to inject the test signal at periodic or regular intervals during operation of the network data bus 17.

Figure 2:
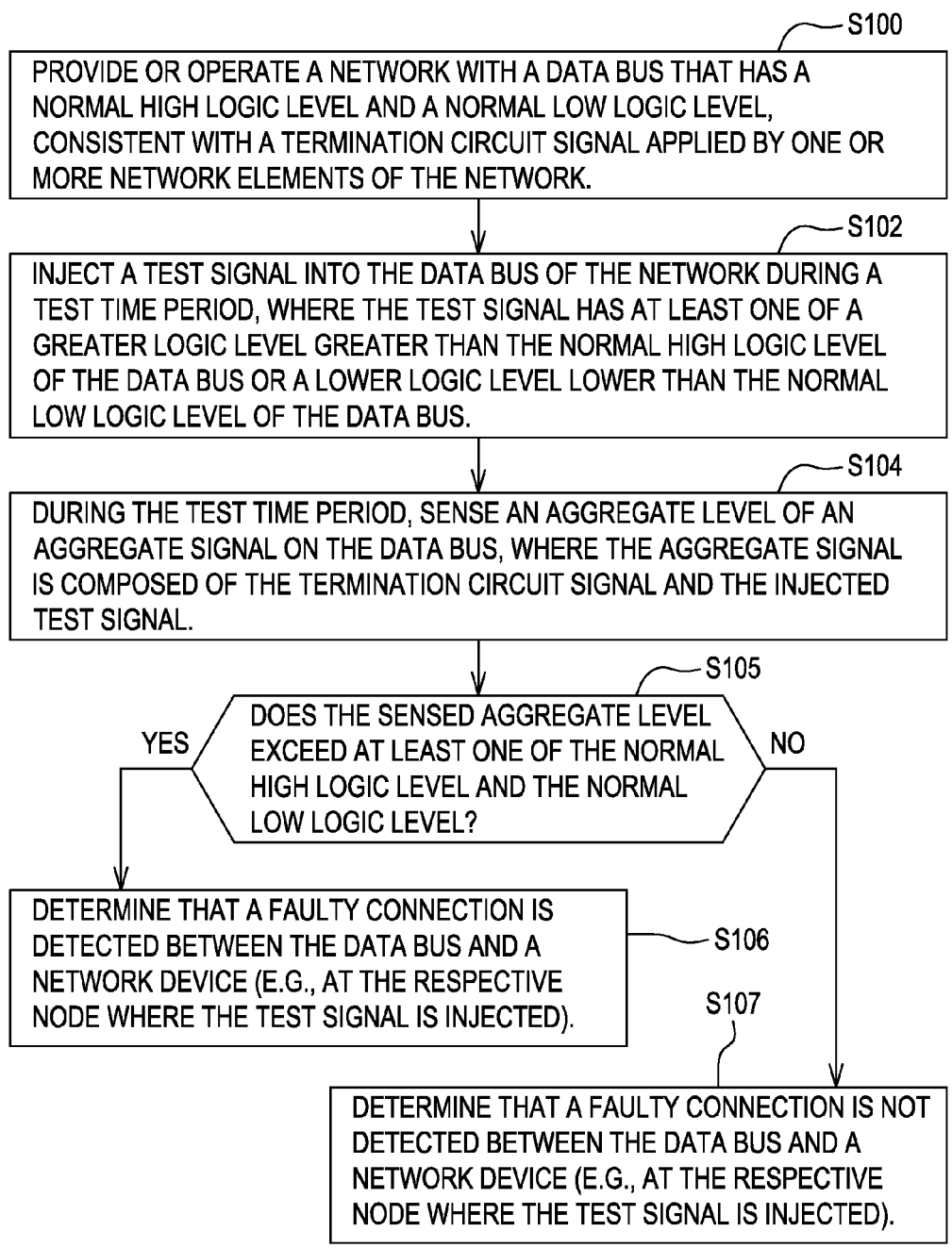
FIG. 2 is a flow chart of one embodiment of a method for diagnosing a fault or open circuit in a network.

FIG. 2 illustrates a method for detecting a fault or open circuit in a network 26. The method of FIG. 2 begins in step S100.

In step S100, a network 26 is operated or provided with a network data bus 17 that has a normal high logic level and a normal low logic level consistent with a termination circuit signal applied by one or more network elements (28, 30, 32) of the network 26. In one configuration, the network data bus 17 comprises a Controller Area Network (CAN) data bus, where the normal high logic level is approximately 3.5 volts direct current (DC) and the normal logic level is approximately 1.5 volts direct current (DC).

In step S102, a network element device (e.g., 44, 144, or 244), a fault injection circuit 34, or a transceiver 46 injects a test signal into the network data bus 17 of the network 26 during a test time period. The test signal has at least one of a greater logic level greater than the normal high logic level of the network data bus 17 or a lower logic level lower than the normal low logic level of the network data bus 17. In one configuration, the vehicle data bus 16 comprises a Controller Area Network (CAN) vehicle data bus 16, the test signal has greater logic level equal to approximately 5 volts direct current (DC) and a lesser logic level equal to approximately 0 volts direct current (DC).

Step S102 may be carried out in accordance with various techniques, which may be applied alternately or cumulatively. Under a first technique, a first network element 28, a fault injection circuit 34, or a transceiver 46 injects the test signal at a first node 18 where a first network element 28 is coupled to the network data bus 17 via a secondary transmission line 24 (e.g., a stub connected to the network data bus 17). Under a second technique, a second network element 30, a fault injection circuit 34, or a transceiver 46 injects the test signal at a second node 20, where the second network element 30 is coupled to the network data bus 17 via the secondary transmission line 24. Under a third technique, a Nth network element 32, a fault injection circuit 34, or a transceiver 46 injects the test signal at an Nth node 20, where the Nth network element 32 is coupled to the network data bus 17 via the secondary transmission line 24. Under a fourth technique, each network element (28, 30, 32), a fault injection circuit 34, or a transceiver 46 injects serially, or in a sequential order, the test signal at each node on a node-by-node basis at the secondary transmission line 24 or stub, where each network element is coupled to the network data bus 17. Under a fifth technique, the network element (28, 30, 32), fault injection circuit 34, or transceiver 46 injects the test signal at periodic or regular intervals during operation of the data bus 17.

In step S104, during the test time period, the network element (28, 30, 32) or detector 35 (e.g., a voltage level detector) senses an aggregate level of an aggregate signal on the network data bus 17. The aggregate signal is composed of the termination circuit signal and the test signal. Step S104 may be carried out in accordance with various techniques, which may be applied alternately or cumulatively. Under a first technique, the first network element 28 or a detector 35 (e.g., voltage level detector) senses or detects the voltage level or logic levels on the network data bus 17 at the first node 18. Under a second technique, the second network element 30 or detector 35 (e.g., voltage level detector) senses or detects the voltage level or logic levels at the second node 20. Under a third technique, the Nth network element 32 or detector 35 (e.g., a voltage level detector) senses or detects, serially or sequentially, the voltage levels or logic levels at each node on the network data bus 17 on a node-by-node basis. Under a fourth technique, the network element (28, 30, 32) or a detector 35 senses or detects the voltage level or logic levels on the network data bus 17 at periodic or regular intervals during operation of the network data bus 17.

In step S105, the network element (28, 30, 32), network element device (44, 144, 244), or the data processor 48 determines if the sensed aggregate level exceeds the normal high logic level, the normal low logic level, or both (e.g., in absolute value terms) during a test time period. For example, in step S105 the network element (28, 30, 32), network element device (44, 144, 244), or the data processor 48 may evaluate the absolute value of the sensed aggregate level and the corresponding absolute value of the normal high logic level and the corresponding absolute value of the normal low logic level to make the above determination. If the network element (28, 30, 32), network element device (44, 144, 244), or the data processor 48 determines that the sensed aggregate level exceeds the normal high logic level, the normal low logic level, or both during the test time period, then the method continues with step S106. However, if the network element (28, 30, 32), network element device (44, 144, 244), or the data processor 48 determines that the sensed aggregate level does not exceed the normal high logic level or the normal low logic level (e.g., on an absolute value basis) during the test time period, then the method continues with step S107.

Step S105 may be carried out in accordance with various techniques that may be applied separately or cumulatively. Under a first technique for executing step S105, the network element (28, 30, 32), network element device (44, 144, 244), or the data processor 48 determines if the sensed aggregate level is higher than the normal high logic level (e.g., a positive DC voltage) or lower than the normal low logic level (e.g., zero volts or a negative DC voltage) during a test time period, such that either the higher or lower sensed aggregate level exceeds the normal high logic level or the normal low logic level.

Under a second technique for executing step S105, transceiver 46 or network element (28, 30, 32) reports the sensed aggregate level, or derivative data derived therefrom, by each node to a diagnostic tool 10 coupled to the network data bus 17, where the network element (28, 30, 32), network element device (44, 144, 244) or the data processor 48 forms the derivative data to indicate whether the sensed aggregate level exceeds at least one of the normal high level and the normal low logic level (e.g., on an absolute value basis).

Under a third technique, the diagnostic tool 10 or network element device (e.g., controller 38 configured as a master controller) assigns each node a different test time period by the diagnostic tool 10 or a master controller 38 on the network 26, where the network element (28, 30, 32), network element device (44, 144, 244). Further, the data processor 48 forms derivative data to indicate whether the sensed aggregate level exceeds at least one of the normal high level and the normal low logic level (e.g., on an absolute value basis) for transmission (e.g., by a network element device or transceiver 46) during its assigned test time period.

Under a fourth technique, the diagnostic tool 10 or network 26 device (e.g., controller 38 configured as a master controller) assigns each node a different test time period within a periodic interval or regular interval. Further, the data processor 48 forms derivative data to indicate whether the sensed aggregate level exceeds at least one of the normal high level and the normal low logic level (e.g., on an absolute value basis) for transmission (e.g., by a network element device or transceiver 46) during the assigned period interval or regular interval.

In step S106, the network element (28, 30, 32), network element device (44, 144, 244), or a data processor 48 of the network 26 device determines that a faulty connection (e.g., open circuit or intermittent connection) between the network data bus 17 and a network element (28, 30, 32) exists, where a faulty connection results in the sensed aggregate level violating a benchmark, such as exceeding at least one of the normal high logic level and the normal low logic level (e.g., on an absolute value basis). Step S106 may be carried out in accordance with various techniques, which may be applied alternately or cumulatively. Under a first technique, the first network element device 44, or a data processor 48 of the first network element device 44 at the first node 18, determines that a faulty connection exists between the first network 26 device and the network data bus 17 if the sensed aggregate level exceeds at least one of the normal high logic level and the normal low logic level (e.g., on an absolute value basis).

Under a second technique, a second network element device 244, a data processor 48 of the second network element device 244 at a second node 20 determines that a faulty connection exists between the second network element device 244 and the network data bus 17 if the sensed aggregate level exceeds at least one of the normal high logic level and the normal low logic level (e.g., on an absolute value basis).

Under a third technique, an Nth network element device 144, a data processor 48 of the Nth network element device 144 at a second node 20 determines that a faulty connection exists between the Nth network element device 144 and the network data bus 17 if the sensed aggregate level exceeds at least one of the normal high logic level and the normal low logic level (e.g., on an absolute value basis).

Under a fourth technique, each network element device (44, 144, 244), a data processor 48 of each network element device (44, 144, 244) at a node (18, 20, 22) determines serially or sequentially on a node-by-node basis that a faulty connection exists between each network element device (44, 144, 244) and the network data bus 17 if the sensed aggregate level exceeds at least one of the normal high logic level and the normal low logic level.

In step S107, the network element (28, 30, 32), network element device (44, 144, 244), or a data processor 48 of the network 26 device determines that a faulty connection is not detected between the data bus and a network device (e.g., at the respective node where the test signal is injected).

FIG. 3 illustrates a sequence diagram or the data flow associated with several diagnostic-related processes including the following: (a) data flow for gathering metrics in block 300, (b) data flow for a fault injection test in block 340, and (c) data flow for clearing diagnostic metrics in block 380.

In block 300, the diagnostic tool 10 gathers metrics by querying the network element device at the first node 18 and the second node 20 for diagnostic data or metrics. For example, the diagnostic tool 10 may send a request to all nodes (e.g., common broadcast message) or sequentially poll each node on node-by-node basis to report diagnostic data to the diagnostic tool 10 over the network 26. The request for query diagnostic metrics 302 is transmitted to a first node 18 and a second node 20. Each network controller 38 may respond individually to the request with diagnostic data in an assigned communication time slot, on a time division multiplex basis, on a frequency division multiplex basis, on a contention basis, in accordance with carrier sense multiple access (CSMA), in a sequential order, in accordance with ALOHA protocol or slotted ALOHA protocol, or otherwise. For example, the first node 18 may respond to the query diagnostic metrics 302 with a first node data message 308 that contains current metrics 304. The second node 20 may respond to the query diagnostic metrics with a second node data message 310 that contains current metrics 306.

In block 340, the diagnostic tool 10 query may trigger the activation of a fault injection test by the fault injection circuit 34 at the first node 18, by another fault injection circuit 34 at the second node 20, or at another node equipped with the fault injection circuit 34. In one configuration, the diagnostic tool 10 listens or reads the network data bus 17 for activity, a quiet command, or a data bus available message that indicates that the diagnostic tool 10 may transmit a request for the fault injection test to the node over the network data bus 17 without disruption or interference with communications traffic over the network data bus 17. In another configuration, the diagnostic tool 10 may transmit or repeat the transmission of a bus quiet command 342 to the first node 18 and the second node 20.

When the network data bus 17 is available or upon receipt of the request, in block 340 the diagnostic tool may transmit a request or command to conduct the fault injection test 344 to the first node 18. The fault injection circuit 34 injects the test signal at a first node 18 where a first network 26 device is coupled to the network data bus 17. The network element or sensor at the first node 18 senses the test signal with a voltage level detector. If the detected voltage level exceeds a threshold voltage level or a normal logic level for the network data bus 17, the faulty connection (e.g., open circuit condition) exists between the first network 26 device and the network data bus 17. For example, if the sensed aggregate level exceeds at least one of the normal high logic level and the normal low logic level, the faulty connection (e.g., open circuit condition) exists between the first network 26 device and the network data bus 17 and the test results or faulty data message and associated node identifier may be reported to the diagnostic tool 10 for display on the user interface 14 of the electronic data processing system. The first node 18 sends a first node data message 352 of the test results 346 to the diagnostic tool 10.

When the network data bus 17 is available or upon receipt of the request, in block 340 the diagnostic tool may transmit a request or command to conduct the fault injection test 344 to the second node 20. The fault injection circuit 34 injects the test signal at a second node 20 where a second network 26 device is coupled to the network data bus 17. The network element or sensor at the second node 20 senses the test signal with a voltage level detector. If the detected voltage level exceeds a threshold voltage level or a normal logic level for the network data bus 17, the faulty connection (e.g., open circuit condition) exists between the second network 26 device and the network data bus 17. For example, if the sensed aggregate level exceeds at least one of the normal high logic level and the normal low logic level, the faulty connection (e.g., open circuit condition) exists between the second network 26 device and the network data bus 17 and the test results or faulty data message and associated node identifier may be reported to the diagnostic tool 10 for display on the user interface 14 of the electronic data processing system. The second node 20 sends a second node data message 354 of the test results 350 to the diagnostic tool 10.

In block 380, the diagnostic tool 10 may reset or clear the diagnostic metrics, test results or faulty data message and associated node identifier at the node or network device. For example, the diagnostic tool 10 may reset or clear the diagnostic metrics, test results or faulty data message by sending a command or data message (e.g., a clear diagnostic metric data message 382) to the first network device at the first node 18 and the second network device at the second node 20. The data processor 48 within the transceiver 46 or the network 26 device will reset one or more data registers or clear the data storage device 40 of one or more accumulated fault or open connection messages consistent with the command, for example. The transceiver 46 may provide an acknowledgement (388, 390) of the clearing of the diagnostic metrics at each node (18, 20) in a first node data message 384 and a second node data message 386.

Figure 4A:
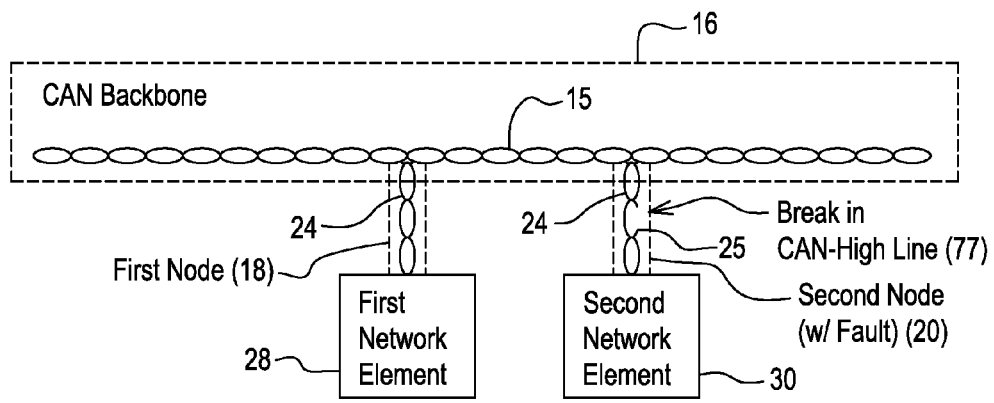
FIG. 4A is a diagram of a hardware example of the network that illustrates an open circuit at a second node.

FIG. 4A shows the network backbone 16 or data bus (e.g., Controller Area Network (CAN) data bus) as comprising a transmission line 15 of a twisted pair of wires, although the network backbone 16 may be implemented as any suitable type of transmission line, including, but not limited to, a coaxial cable, a multi-conductor cable, or an optical cable. A first network element device 28 is coupled to the network data bus 17 at a first node 18 via a secondary transmission line 24 (e.g., tributary twisted pair). A second network element 30 is coupled to the data bus or network backbone 16 at a second node 20 via a secondary transmission line 24 (e.g., tributary twisted pair). As illustrated, there is an open circuit or break 77 in the secondary transmission line 24 associated with the second node 20.

Figure 4B:
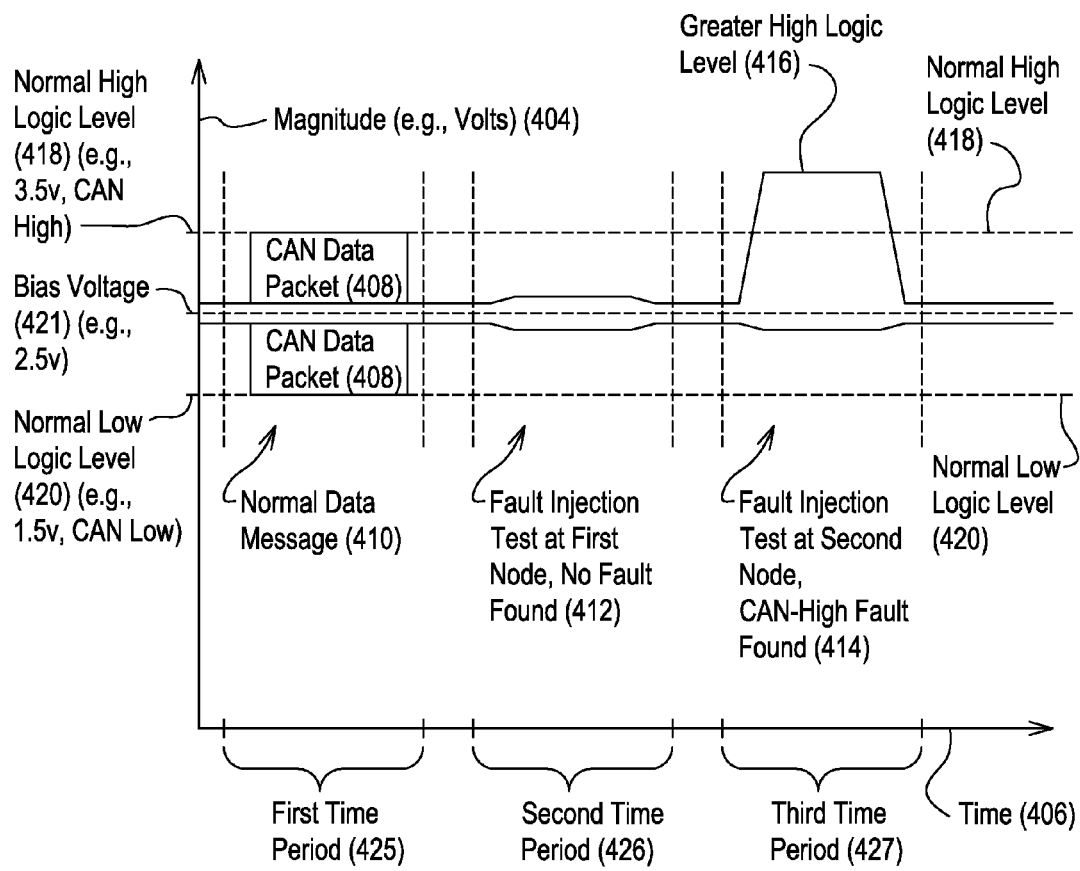
FIG. 4B is a diagram of a signal magnitude versus time on the network data bus.

FIG. 4B is a diagram that shows a waveform and magnitude of signals on the data bus (e.g., CAN data bus) or the network backbone 16 during several time periods, labeled a first time period 425, a second time period 426, and a third time period 427. The vertical axis of FIG. 4B indicates voltage or magnitude 404 of the signals on the data bus 17, whereas the horizontal axis of FIG. 4B indicates time 406. The waveform of FIG. 4B provides an illustration of the detection of the open circuit or break 77 shown in FIG. 4A, as described in more detail below.

In FIG. 4B, during a first time period 425, a data message packet 408 (e.g., CAN message) is transmitted over the data bus 17 or network backbone 16. For example, the data message packet may comprise a normal data message 410 or other digital data that is transmitted from first node 18 or the second node 20, or vice versa. Because of the open circuit at the second node 20, the transmission is not effectively communicated (e.g., robustly or reliably communicated) between the network element devices associated with the first node 18 and the second node 20. The normal data message 410 is consistent with digital logic levels specified for the data bus 17, the network backbone 16 or data network 26. For example, in the first time period 425 the CAN data packet is between a normal low logic level 420 (e.g., CAN-Low or 1.5 Volts Direct Current) and a normal high logic level 418 (e.g., CAN-High or 3.5 Volts Direct Current).

During a second time period 426, no data message is transmitted. Instead, a test signal is transmitted from the first network element device 44 at a first node 18 and detected by the detector 35 of the first network element 28 at the first node 18. The detected voltage level only results in no material deviation or a slight deviation of the direct current bias voltage level 421 on the network data bus 17. As illustrated in FIG. 4B, the slight deviation is represented by a slight curvature that approaches a limit above and below the horizontal dashed line indicating the bias voltage (e.g., 2.5 Volts Direct current) of the network data bus 17.

During a third time period 427, no data message is transmitted. Instead, the fault injection circuit 24 transmits a test signal from the second network element 30 the second node 20. The detected voltage level at the detector 35 at the second node 20 results in a significant deviation of the direct current bias voltage on the data bus, or at least on the secondary transmission line 24. The significant deviation or greater high logic level 416 is illustrated as a step function or generally rectangular waveform in FIG. 4B. The deviation is possible because of the open circuit that exists at the break 77 that is associated with the second node 20. Accordingly, at the second node 20, the voltage level detector of the second network element device 30 recognizes the significant deviation, the step function or the generally rectangular waveform as a fault or open circuit in the data bus or the connection at the second node 20, or the secondary transmission line 24 at the second node 20, for example.

Figure 5A:
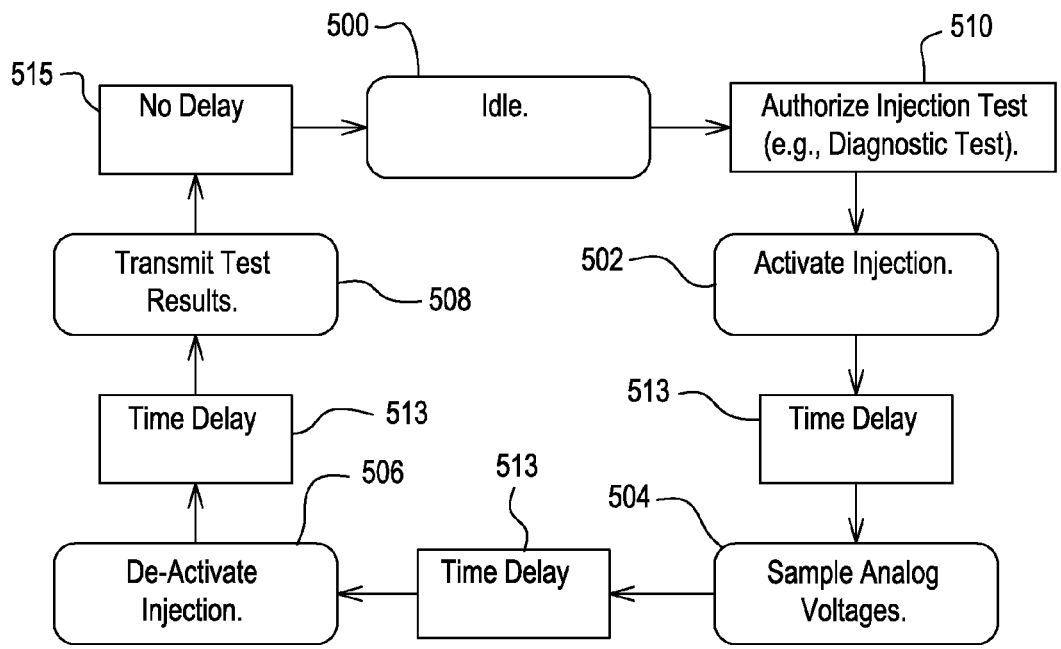
FIG. 5A and FIG. 5B provide functional state diagrams for diagnostic software (e.g., remote diagnostic software, primary diagnostic software or both).
Figure 5B:
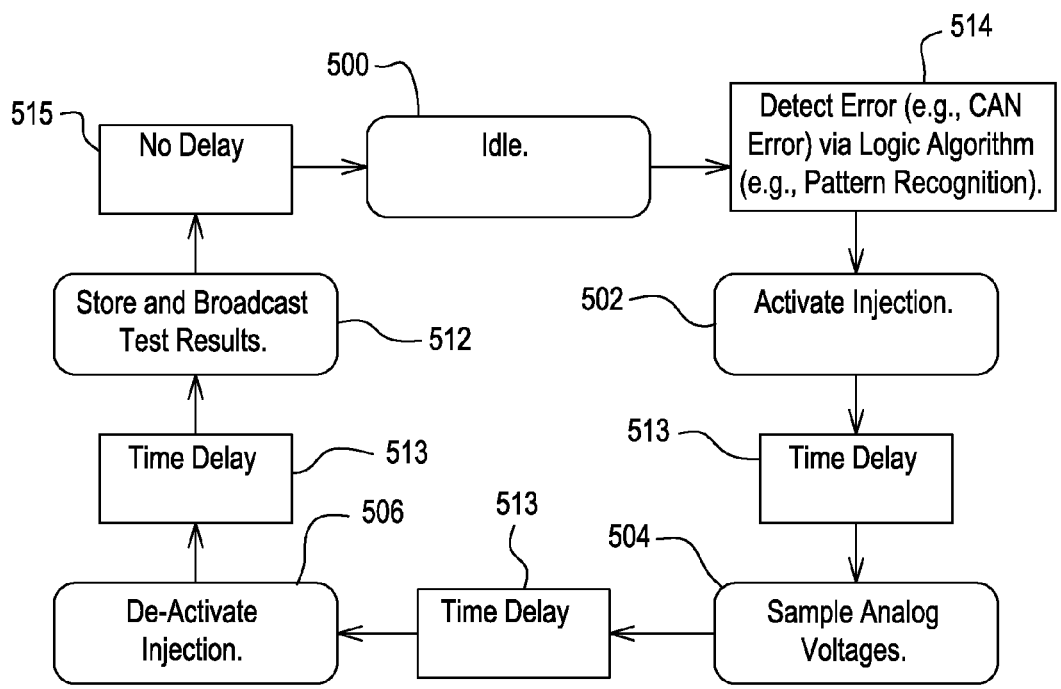

FIG. 5A and FIG. 5B provide functional state diagrams for the diagnostic software, which may be applicable to any embodiment of the diagnostic system, such as that in FIG. 1. In FIG. 5A, the diagnostic software illustrates states associated with the fault injection test. In block 500, the diagnostic software has a first state in which the software is idle.

In a second state of block 510, the diagnostic tool 10 authorizes or requests a diagnostic test or injection test. A user may connect the diagnostic tool 10 (e.g., a portable diagnostic tool 10) to the data bus or backbone network 16 via a secondary transmission line 24 or stub connection and activate a request for a diagnostic test via the user interface 14, for example.

In block 502, the network element device activates the injection of a test signal in response to the request or authorization of the diagnostic tool 10. After the injection and a possible time delay 513, in a third state in block 504, the network element device or its diagnostic software is instructed to sample analog voltages on the data network 26 or network backbone 16 (e.g., data bus). A possible time delay 513 follows block 504.

In block 506 in a fourth state after the injection of the test signal is completed, the network element device or the diagnostic software deactivates the injection of the test signal. A possible time delay 513 follows block 506.

In block 508 in a fifth state, the test results are transmitted from the network element device to the diagnostic tool 10 via the network 26 or data bus. Alternatively, the test results are transmitted from the network element device to the diagnostic tool via a secondary wireline interface or a wireless interface, if the network 26 or network data bus 17 does not support the reliable transmission of data because of a fault or condition. No delay 515 follows block 508, where the state returns to idle 500.

FIG. 5B is similar to FIG. 5A, except the first state in block 514 is different than the first state in block 510 of FIG. 5A and the fifth state in block 512 of FIG. 5B is different than the fifth state of block 508 of FIG. 5A. Like states, procedures or blocks in FIG. 5A and FIG. 5B are indicated by like reference numbers.

The state diagram of FIG. 5B is geared toward a self-activated diagnostic test, as opposed to a user-activated diagnostic test from a user interface 14, consistent with FIG. 5A. For example, in FIG. 5B the diagnostic tool 10 may be disconnected from the data bus, at least temporarily or the user interface 14 may be inactive.

In block 514 of FIG. 5B a network element (28, 30, 32), a fault injection circuit 34, or a data processor 48 detects an error (e.g., a CAN error) via logic algorithm (e.g., pattern recognition in one or more error codes, as a triggering event, that indicate a diagnostic test or injection of a test signal is warranted). In block 514, a network element (28, 30, 32), a fault injection circuit 34, or a data processor 48 may trigger activation of the injection in block 502 by a triggering event such as the occurrence of one or more of the following: the lapse of time period, the expiration of a timer, at a scheduled time scheduled by a user via the user interface 14, a periodic test, detection of one or more errors (e.g., CAN data bus error messages) detected by the controller 38, the transceiver 46, or the network element.

In block 512 the fifth state of FIG. 5B, the test results are stored for later broadcasting and broadcasted when a suitable transmission path is available between the network element and the diagnostic tool 10. The suitable transmission path may entail a data bus, or via a secondary wireline interface or a wireless interface, for example.

Having described the preferred embodiment, it will become apparent that various modifications can be made without departing from the scope of the invention as defined in the accompanying claims.

The following is claimed:

1. A method for diagnosing a fault or open circuit in a network, the method comprising:
    operating a data bus of a network that has a normal high logic level and a normal low logic level consistent with a termination circuit signal applied by one or more network elements of the network;
    injecting a test signal into the data bus of the network during a test time period, the test signal having at least one of a greater logic level greater than the normal high logic level of the data bus or a lower logic level lower than the normal low logic level of the data bus;
    during the test time period, sensing an aggregate level of an aggregate signal on the data bus, the aggregate signal composed of the termination circuit signal and the test signal; and
    determining whether a faulty connection between the data bus and a network device exists, where a faulty connection results in the sensed aggregate level exceeding at least one of the normal high logic level and the normal low logic level.

2. The method according to claim 1 wherein:
    the injecting comprises injecting the test signal at a first node where a first network device is coupled to the data bus,
    the sensing comprises sensing at the first node, and
    the determining comprises determining at the first node or at a diagnostic tool, coupled to the data bus, that the faulty connection exists between the first network device and the data bus if the sensed aggregate level exceeds at least one of the normal high logic level and the normal low logic level.

3. The method according to claim 2 wherein:
the injecting comprises injecting the test signal at a second node where a second network device is coupled to the data bus,
the sensing comprises sensing at the second node, and
the determining comprises determining at the second node or a diagnostic tool, coupled to the data bus, that the faulty connection exists between the second network device and the data bus if the sensed aggregate level exceeds at least one of the normal high logic level and the normal low logic level.

4. The method according to claim 1 wherein:
the injecting and the sensing are repeated on a node-by-node basis at each node of the data bus in the network, where each node is formed at the connection or attempted connection of a network device to the data bus;
reporting the sensed aggregate level by each node to a diagnostic tool coupled to the data bus.

5. The method according to claim 4 wherein each node is assigned a different test time period by the diagnostic tool or a master controller on the network.

6. The method according to claim 5 wherein each node is assigned a different test time period within a periodic interval or regular interval.

7. The method according to claim 1 wherein the injecting occurs at periodic or regular intervals during operation of the data bus.

8. The method according to claim 1 wherein the data bus comprises a Controller Area Network data bus and wherein the test signal has greater logic level equal to approximately 5 volts direct current and a lesser logic level equal to approximately 0 volts direct current, and wherein the normal high logic level is approximately 3.5 volts direct current and the normal logic level is approximately 1.5 volts direct current.

9. A system for diagnosing a fault or open circuit in a network, the system comprising:
a network comprising a data bus and one or more network elements, the data bus having a normal high logic level and a normal low logic level consistent with a termination circuit signal applied by said one or more network elements of the network;
a fault injection circuit for injecting a test signal into the data bus of the network during a test time period, the test signal having at least one of a greater logic level greater than the normal high logic level of the data bus or a lower logic level lower than the normal low logic level of the data bus;
an analog-to-digital converter coupled to a voltage level detector for sensing an aggregate level of an aggregate signal on the data bus, the aggregate signal composed of the termination circuit signal and the test signal;
a diagnostic tool for determining whether a faulty connection between the data bus and a network device exists, where a faulty connection results in the sensed aggregate level exceeding at least one of the normal high logic level and the normal low logic level.

10. The system according to claim 9 wherein:
a first network device coupled to the data bus at the first node, the first network device comprising one of said one or more network elements;
the fault injection circuit of the first network device facilitating injection of the test signal at a first node;
a voltage level detector, of the first network device, for sensing a voltage level at the first node; and
a data processor for determining that a faulty connection exists between the first network device and the data bus at the first node if the sensed aggregate level exceeds at least one of the normal high logic level and the normal low logic level.

11. The system according to claim 10 further comprising:
a second network device coupled to the data bus at a second node, the second network device comprising one of said one or more network elements;
a second fault injection circuit of the second network device facilitating injection of the test signal at a second node;
a second voltage level detector, of the second network device, for sensing a voltage level at the second node; and
a second data processor for determining that a faulty connection exists between the second network device and the data bus at the second node if the sensed aggregate level exceeds at least one of the normal high logic level and the normal low logic level.

12. The system according to claim 9 wherein:
each one of said one or more network elements comprising a corresponding fault injection circuit and a corresponding voltage level detector;
the corresponding fault injection circuit configured or adapted to inject the test signal on a node-by-node basis at each node of the data bus in the network;
the corresponding voltage level detector sensing the detected voltage level on a node-by-node basis at each node of the data bus in the network, where each node is formed at the connection or attempted connection of a network device to the data bus; and
a transceiver in each network device for reporting the sensed aggregate level by each node to the diagnostic tool coupled to the data bus.

13. The system according to claim 12 wherein each node is assigned a different test time period by the diagnostic tool or a master controller on the network.

14. The system according to claim 13 wherein each node is assigned a different test time period within a periodic interval or regular interval.

15. The system according to claim 9 wherein each fault injection circuit at each node has instructions or receives a triggering signal to inject the test signal at periodic or regular intervals during operation of the data bus.

16. The system according to claim 9 wherein the data bus comprises a Controller Area Network data bus and wherein the test signal has greater logic level equal to approximately 5 volts direct current and a lesser logic level equal to approximately 0 volts direct current, and wherein the normal high logic level is approximately 3.5 volts direct current and the normal logic level is approximately 1.5 volts direct current.

17. The system according to claim 9 wherein the fault injection circuit injects the test signal into the data bus via a resistive interface with a high impedance with respect to the data bus.

* * * * *